No. 639,675. Patented Dec. 19, 1899.
R. H. EMRY.
CREAM SEPARATOR.
(Application filed Sept. 2, 1899.)
(No Model.)
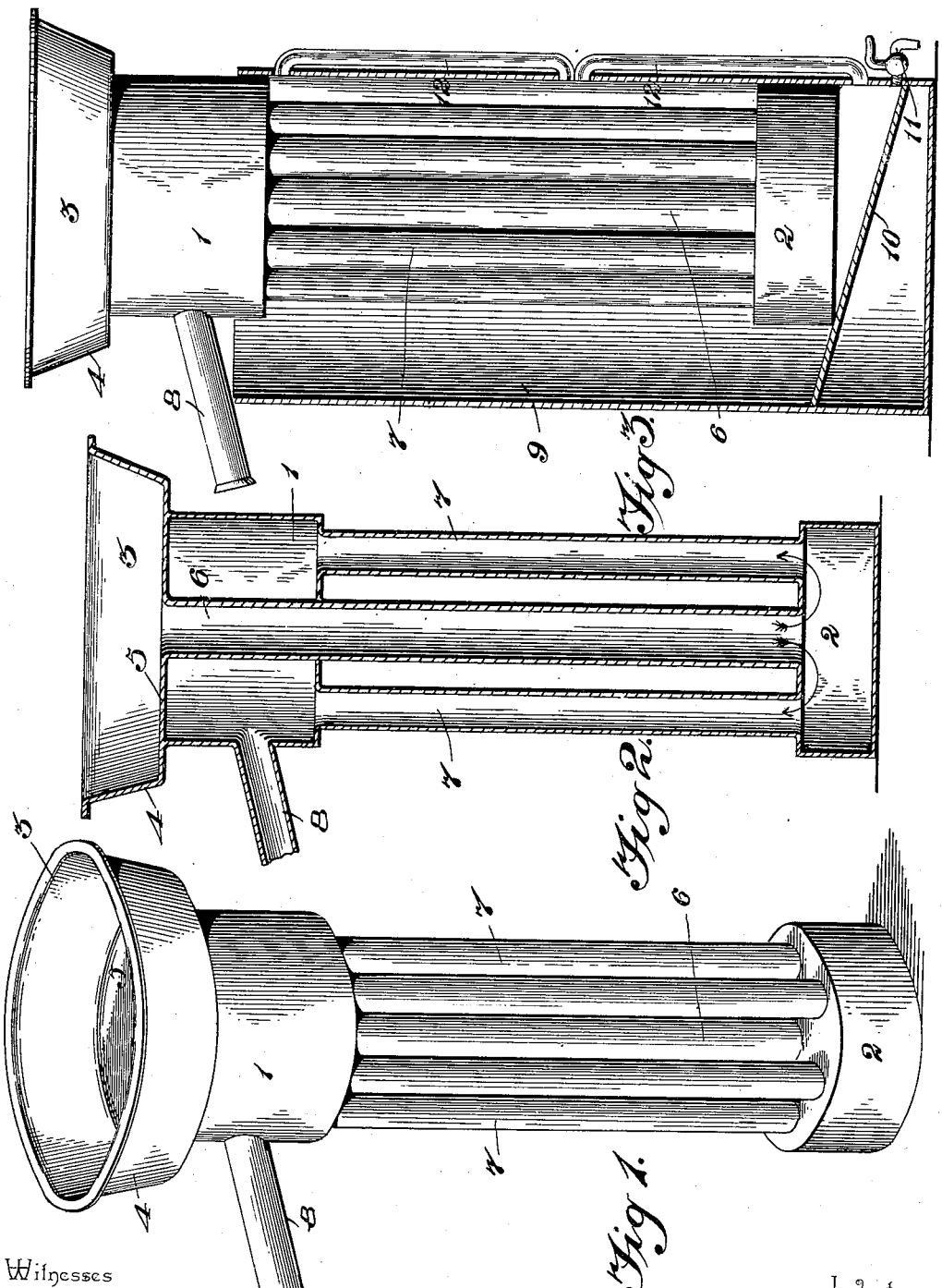
Witnesses
John Maupin.
Chas. S. Hyer.
By his Attorneys, R. H. Emry.
C. A. Snow & Co.
Inventor

UNITED STATES PATENT OFFICE.

ROBERT H. EMRY, OF WASHINGTON, IOWA.

CREAM-SEPARATOR.

SPECIFICATION forming part of Letters Patent No. 639,675, dated December 19, 1899.

Application filed September 2, 1899. Serial No. 729,380. (No model.)

*To all whom it may concern:*

Be it known that I, ROBERT H. EMRY, a citizen of the United States, residing at Washington, in the county of Washington and State of Iowa, have invented a new and useful Cream-Separator, of which the following is a specification.

This invention relates to a cream-separator, and has for its object to provide simple and effective means of introducing a cooling medium at the bottom portion of a quantity of milk and maintaining a lower cold temperature by causing the animal heat of the milk to be counteracted in its obstructive influence and to have the cooling medium as heated to rise and overflow from the improved device and give place to a colder quantity of the said medium without bringing the milk directly in contact therewith, and thus hasten the separation of the two elements of the milk.

The invention consists in the construction and arrangement of the several parts, which will be more fully hereinafter described and claimed.

In the accompanying drawings, Figure 1 is a perspective view of the improved separating device. Fig. 2 is a transverse vertical section of the same. Fig. 3 is a transverse vertical section of the separating-can, showing the improved separating device in elevation therein in operative position.

Similar numerals of reference are employed to indicate corresponding parts in the several views.

The numerals 1 and 2 respectively designate upper and lower drums, and on the upper drum a receiver 3 is positioned and has a flared rim 4. The bottom 5 of the said receiver closes the top of the drum 1, and connected to the center thereof is the upper end of a pipe 6, which passes downwardly through the center of the said drum 1 and is also connected to the center of the top of the drum 2. Through the medium of the pipe 6 the receiver 3 has communication with the drum 2; but it will be observed that communication between the drum 1 and the said receiver is completely obstructed by the bottom 5 of the latter closing over the top of the said drum 1. Concentrically arranged with relation to the pipe 6 and opening at their upper and lower ends into the drums 1 and 2 are a series of smaller pipes 7, and extending outwardly from one portion of the said drum 1 is an overflow-spout 8. The dimensions of the drum 1 are greater than those of the drum 2.

In the use of the device it is placed within a cream-separating pan 9 or other receptacle; but it is preferred that the can be of the form shown in Fig. 3 and having an inclined bottom 10, with a faucet 11 attached to the can at the lowest level of the said bottom. The can is also provided in the preferred construction with gages 12 for obvious purposes, and when the separating device has been disposed in the can—for instance, as shown in Fig. 3—the milk in a heated condition and as taken from the animal is poured into the said can and circulates in and about the pipes 6 and 7. Cold water is then poured into the receiver 3 and flows downwardly through the pipe 6 into the drum 2, and by the addition of successive quantities in the said receiver the said drum 2 and the lower portion of the pipes 7 are continuously cooled. This gradually cools the lower portion of the quantity of milk, and as the cold water becomes heated owing to the contact of the pipes with the milk it rises in the pipes 7 and is forced upwardly into the drum 1 as successive charges of cold water are supplied to the receiver 3. This operation is continued until a thorough separation of the cream from the milk takes place after the elimination of the animal heat as an entirety and which will not ensue until the quantity of milk has acquired a uniformly-low temperature throughout. It will be observed that the water is prevented from contacting directly with the milk at any point, and by having the warm water quickly and constantly released the effectiveness of the incoming quantities of cold water is materially increased and the operation of separation facilitated to a marked degree.

It will be observed that the pipe 6 forms the only feeding means for the drum 2 and that the drum 1 has a plurality of feeds, which unitedly delivering the water into said drum will cause the latter to rapidly fill, and but for the provision of the closed top to the latter drum the water would dash out and the warm and cold water thus mingle and also endanger mixing the same with the milk in the can 9. By the present arrangement the water delivered in the drum 1 is caused to flow out through the spout 8 with considerable force owing to the weight-pressure exerted thereagainst by the continual supply through the pipe 6 into the drum 2. By making the drum 2 smaller than the drum 1 one charge of water will be more quickly replaced by a subsequent colder charge owing to the fact that the containing capacity of the said drum 2 will be overtaxed comparatively considered with relation to the supply. This feature of construction will also add to the forceful delivery of the water into the drum 1 through the pipes 7 to a certain extent. The particular mode of supplying water to the receiver 3 is not essential so long as the water has a continuous flow for a given period that may be necessary to separate the quantity of milk in which the separator is deposited. It is also necessary to avoid overflow of the receiver, and care will be taken to have the influx about proportionate to the outflow capacity of the pipe 6 and the discharge through the spout 8. A further advantage of the increased dimension of the drum 1 is that back pressure will be prevented and the circulation unretarded. This will tend to hasten the cooling of the milk by means of a more rapid supply of the cooling medium.

In addition to the advantage accruing from the bottom 5 of the receiver 3 completely closing the top of the drum 1 and preventing slopping over of the contents of said drum, which if allowed would result in serious diluting injury to the milk and retardation of the separation sought, the said receiver is enlarged and given an increased containing capacity by making the said bottom 5 of greater diameter than the drum 1, and with the flaring rim 4 provides means for filling with water or other cooling medium and permits the device to be charged in excess of the working capacity of the device and to automatically feed when the outflow permits and avoid the necessity of constant attention and rapid repeated replenishment, as in kindred devices employing a funnel. Also the weight of the water or other cooling medium in the receiver under the conditions mentioned will add to the force tending to drive up the preceding charges into the drum 1, and thereby quicken the operation. It will also be observed that the overflow or outflow spout 8 is of considerably less diameter than that of the combined inflow devices to the drum 1 and the pipe 6, whereby the cooling medium will be caused to fully operate before reaching a temperature of ineffective degree, and by downwardly inclining said spout the outflow is expedited proportionately to the diameter of the spout.

Numerous other advantages will become apparent to those using the device, and to accommodate various applications changes in the form, proportions, and minor details of construction may be resorted to without departing from the spirit of the invention.

Having thus described the invention, what is claimed as new is—

A separator comprising upper and lower drums connected by a plurality of pipes opening at their opposite extremities into the drums, the upper drum being larger than the lower drum and having a closed top formed by the flat bottom of a receiver, said bottom being of greater diameter than the said upper drum and having a flaring rim to thereby provide means for permitting the receiver to be charged with the cooling medium in excess of the quantity required by the working capacity of the separator, said bottom also preventing the contents of the upper drum slopping over into the milk, a central pipe extending downwardly from the center of the bottom of the receiver and incommunicably through the upper drum to the center of the top of the lower drum and of greater diameter than the plurality of pipes spaced apart and concentrically surrounding the same, and a downwardly-inclined outflow-spout attached to an intermediate portion of the upper drum and having a diameter considerably less than the inflow devices to said upper drum.

In testimony that I claim the foregoing as my own I have hereto affixed my signature in the presence of two witnesses.

ROBERT H. EMRY.

Witnesses:
C. O. BAILY,
J. P. McANULTY.